Feb. 2, 1926.
L. C. COLE
TOOL HOLDER
Filed Nov. 2, 1922
1,571,322
2 Sheets-Sheet 2
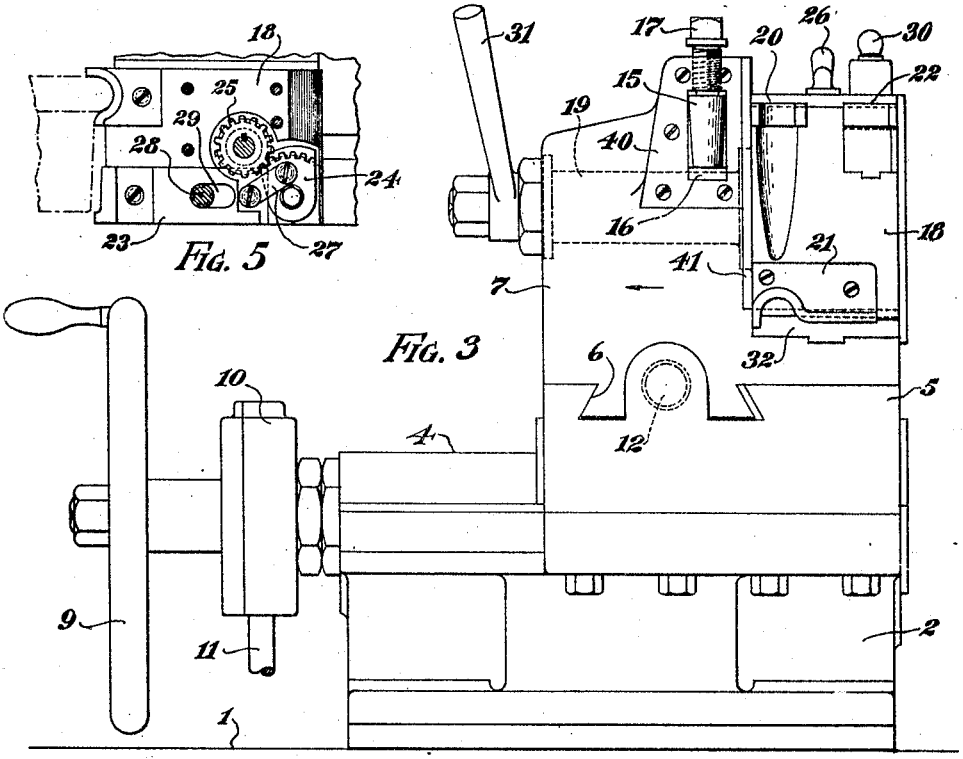
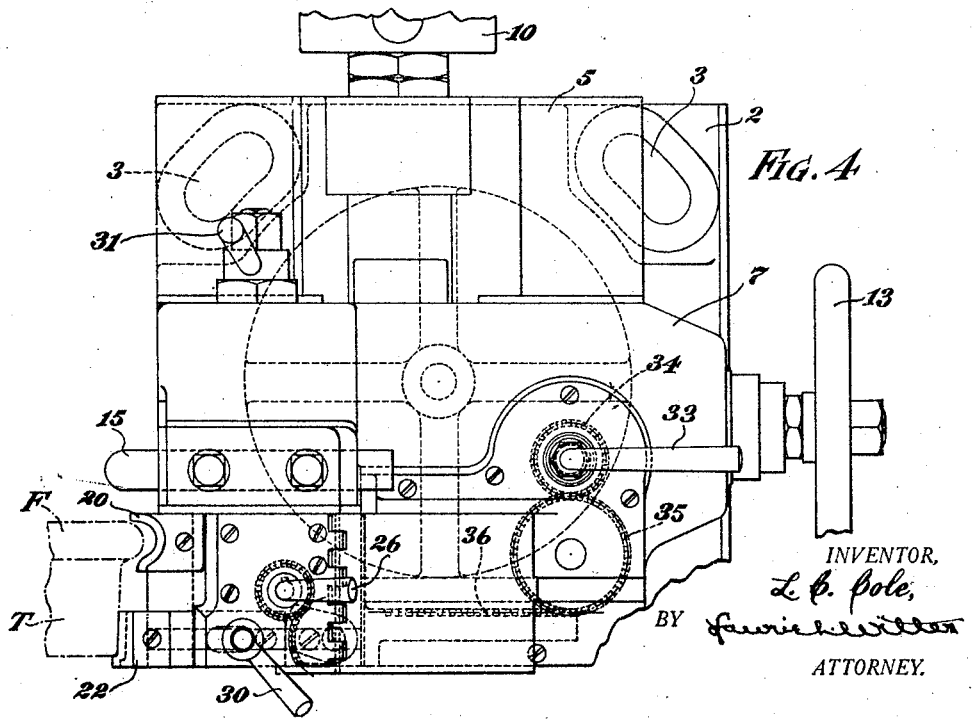
INVENTOR,
L. C. Cole,
BY
ATTORNEY.

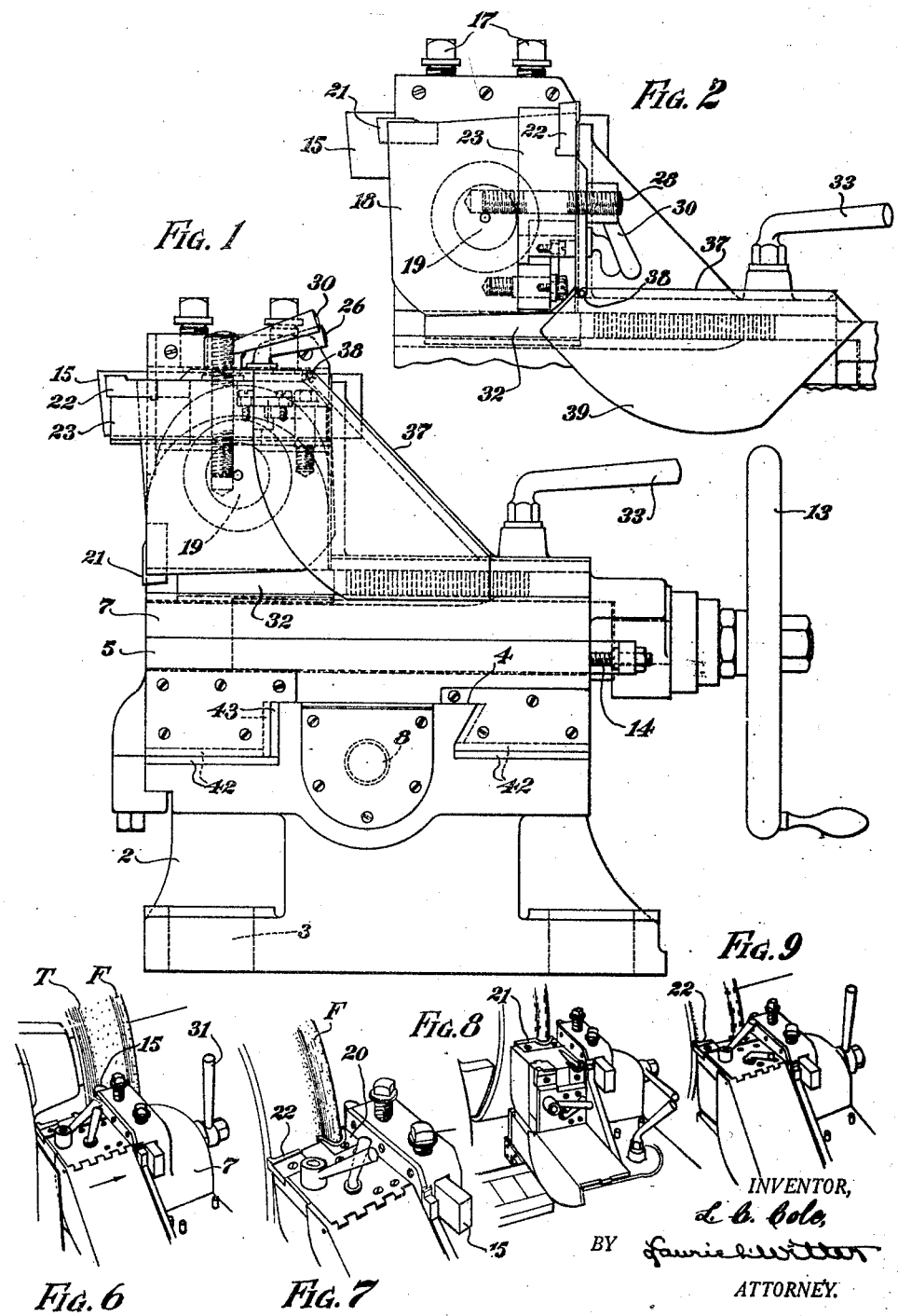

Patented Feb. 2, 1926.

1,571,322

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

TOOL HOLDER.

Application filed November 2, 1922. Serial No. 598,594.

*To all whom it may concern:*

Be it known that I, LYNDON C. COLE, a citizen of the United States, residing at Hamilton, in the county of Butler and State of Ohio, have invented certain new and useful Improvements in Tool Holders, of which the following is a specification.

This invention relates to tool holders and particularly to a turret tool holder for use on car and locomotive wheel lathes. The turning of car wheels requires certain rough cutting operations and certain finishing operations and such operations require the use of a plurality of tools. In ordinary practice, when turning a car wheel, the tool must be changed for each of these operations. The present invention contemplates an improved construction for mounting certain of these tools on a tool turret whereby the several tools may be brought successively into position for performing their cutting operations, thus eliminating the necessity of removing and changing the tool for each cutting operation.

It is an object of the invention to provide a tool holder comprising a slide combining a roughing tool supported rigidly thereon for performing the first and heaviest cut on the work and a tool turret supporting a plurality of tools adapted to be brought successively into cutting position for performing the lighter and finishing cuts.

It is another object of the invention to provide a turret tool holder comprising a rotary tool turret adapted to support a plurality of tools thereon and means for mounting two tools adjacent each other on the turret in such a manner that either of such tools may be brought to operate on the work in the same indexed position of the turret.

Another object of the invention is to provide a turret tool holder of the type stated and in combination therewith means including a sliding wedge for rigidly locking and supporting the turret in any of its operating positions and other means comprising a guard pivoted to the carriage and operative in all positions of the turret to prevent dust and chips from entering certain operating parts of the holder.

With these and other objects in view, my invention consists in the features of construction and operation set forth in the following specification and illustrated in the accompanying drawings. In such drawings annexed hereto and forming a part of this specification, I have shown one embodiment of my invention adapted for use on a car wheel lathe but it will be understood that the invention can be otherwise embodied and that the drawings are not to be construed as defining or limiting the scope of the invention, the claims appended to this specification being relied upon for that purpose.

Referring to the drawings:

Figure 1 is a side elevation of a tool holder comprising the present invention.

Fig. 2 is a fragmentary view thereof showing the turret indexed to a position other than that shown in Fig. 1.

Fig. 3 is a front elevation of the tool holder as shown in Fig. 1.

Fig. 4 is a plan view thereof.

Fig. 5 is a plan view of the turret as shown in Fig. 4, but with the cover plate removed and one of the tools drawn backwardly into its inoperative position.

Figs. 6, 7, 8 and 9 are fragmentary perspective views showing the four cutting steps in the operation of turning a car wheel by the use of my improved holder, the four tools used being shown successively in operation in such views.

As heretofore stated, the tool holder comprising the invention is particularly applicable for use on car wheel lathes. Such a lathe ordinarily comprises two opposed driving face plates rotatably mounted in heads on opposite ends of the lathe bed, the face plates being adapted respectively to drivingly engage two car wheels mounted on the ends of an axle therebetween. To tool holders, such as the one illustrated in the accompanying drawings, are mounted on the lathe bed between the car wheels to respectively operate on such two wheels. In the drawings, I have illustrated a left hand tool holder, that is, a tool holder adapted to operate on the car wheel adjacent the left hand end of the lathe. This tool holder will now be specifically described by reference to the accompanying drawings.

In the drawings, 1 indicates the bed of a lathe on which the base 2 of the tool holder is adapted to be adjustably bolted, the base being provided with elongated openings 3 for such purpose. Mounted on a guideway 4 on the base for sliding movement therealong in a direction longitudinally of the lathe bed is a slide or carriage 5. Mounted on a dove-tail guideway 6 of the slide 5 for sliding movement thereon in a direction at right angles to the movement of the slide 5 is a slide 7. The slide 7 which is the tool support proper is ordinarily termed the cross slide and the slide 5 is the intermediate or traversing slide.

The slide 5 may be moved along its guideway to feed or traverse the tool holder longitudinally of the work by means of a screw 8 operated either by a hand wheel 9 or automatically from the lathe feed shaft through a feed ratchet 10, a rod 11 operatively connecting the ratchet to the feed shaft. The slide 7 may be moved along its guideway to move the tool holder toward and from the work by means of a screw 12 operated by a hand wheel 13. A screw 14 is provided on the slide 7 for adjusting a gib to take up wear in the slide.

In turning car wheels, the first or roughing cut taken on the wheel is the heaviest cut and the tool for performing the same must accordingly be heavy and supported in a rigid manner to withstand the shocks and thrusts incident to such operation. For this purpose, I mount a heavy tool 15 directly on the cross slide 7 and support such tool between a hardened serrated steel plate 16 and two large clamping screws 17. In operating with this tool the slide 5 is fed along its guideway by means of the lathe feed shaft operating through the ratchet 10, whereby the tool 15 is moved over the work in the direction of the arrow as indicated in Fig. 6. The tool 15 operates only to rough cut the thread T and flange F of the wheel, other and further tools and operations being required to further rough cut the flange F thereof and to finish such surfaces. The improved means for performing these operations with facility will now be described.

The tools for further operating on the work are preferably mounted on a turret which comprises a massive piece of metal 18 secured rigidly to one end of a spindle 19 rotatably mounted in the cross slide 7. The head 18 of the turret is preferably of forged oil hardened die steel ground and polished in a manner to particularly adapt the same to dissipate the heat from the cutting tools without distortion or annealing and to prevent chips and other particles of metal from embedding themselves in the turret, the construction furthermore being such as to withstand the shock of cutting and to be practically indestructible.

The head 18 of the turret is illustrated as being approximately square in end elevation and as supporting three tools thereon. Two of these tools, 20 and 22, are supported on one face of the turret and the third tool 21 is supported on an adjacent face. The tool 20 which may be termed the flange roughing tool, is secured rigidly to the turret as is also the flange and tread finishing tool 21. The tread chamfering tool 22 is slidably mounted on the same face of the turret with and laterally of the tool 20 in the manner and for the purpose hereinafter described.

The tool 22 is mounted on a slide 23 movable on the turret toward and from the work (Fig. 5). This tool is shown in its operative position in Fig. 4 and in its inoperative position in Fig. 5. The means for adjusting the tool to these positions comprises a gear segment 24 meshing with a pinion 25 operated by a handle 26. A link 27 connects the segment 24 with the slide whereby rotation of the pinion will operate to move the slide toward and from the work. A stud 28 extending through a slot 29 in the slide and threadedly engaged by a clamping handle 30 serves to clamp the slide in either of its positions. It will be obvious that when the tool 22 is in its inoperative position (Fig. 5), the tool 20 is relatively forward and in its operative position and when the tool 22 is in its operative position (Fig. 4) the tool 20 is relatively to the rear thereof and in its inoperative position.

Either of tools 20 and 22 may be used to operate on the work with the turret in the indexed position shown in Figs. 1, 3, 4, 5, 6, 7 and 9. When tool 21 is to be used, the turret must be indexed to the position shown in Figs. 2 and 8, approximately 90° as illustrated. The turret is rotated to index the same by means of a handle 31 and may be locked in its indexed position by means of a sliding wedge 32. This wedge is preferably inclined on its upper surface only and operates between a top flat surface of the support or slide and one of the flat lateral faces of the turret head 18. The wedge not only forms a lock for preventing rotation of the turret but the width and thickness of the wedge is such that the same forms substantially a solid block of metal between the slide 7 and the turret head 18, thereby sustaining the heavy downward pressure from the tools and relieving the spindle of the turret from undue torsional or shearing strains. The wedge is actuated into and out of locking position by means of a handle 33 operating a pinion 34 engaging an idler gear 35 in turn meshing with rack teeth 36 on the wedge.

A guard 37 is provided for preventing dust and chips from falling upon and entering the wedge and other operating parts of the tool holder. One end of this guard is pivoted to the turret at 38, the other end being adapted to slide on the support 7 to the rear of the turret 18. In one indexed position of the turret, the guard is inclined as in Fig. 1 and in the other position of the turret, the guard is flat on the support 7 as in Fig. 2, the pivot at 38 permitting such free movement of the guard.

It will furthermore be noted that one side of the guard extends downwardly at 39 thereby practically enclosing the operating parts in all positions of the turret.

A hardened steel plate 40 is fastened to the front face of the tool support about the tool 15 whereby the cutting of the support by chips is prevented. Another hardened steel plate 41 is secured to the face of the support adjacent the turret head 18 whereby, in indexing, two hardened steel surfaces are in contact. This construction prevents wear on the support, eliminates cutting thereof by chips and insures easy indexing of the turret. Other hardened steels plates 42 and 43 are provided between the base 2 and the slide 5 whereby to take the downward and backward thrusts from the cutting tool. These plates also provide for easy manipulation of the slide 5 on the base 2 and prevent the cutting of such parts by chips and dirt.

The operation of the tools in turning a car wheel is as follows:

*First cutting step—Fig. 6.*

The thread T and flange F of the wheel is first rough turned by the heavy roughing tool 15 in the manner heretofore described. This operation is shown in Fig. 6. The feeding of the tool in performing this operation is by power through the ratchet 10 and in the direction of the arrow, Fig. 6.

*Second cutting step—Fig. 7.*

The next cutting operation is the further rough turning of the flange F of the wheel. This operation is performed by the tool 20 having a cutting edge formed approximately to the shape of a finished car wheel flange. The tool support is adjusted along the guideway 4 by means of the hand wheel 9 to bring the tool 20 into the position shown in Fig. 7 where it is adapted to operate on the flange F. The tool is fed into the work by rotating the hand wheel 13. During this operation of tool 20, the tool 22 is in the inoperative position shown in Fig. 5.

*Third cutting step—Fig. 8.*

The next cutting operation is the finish turning of the flange and tread. This operation is performed by the finishing formed tool 21 on another face of the turret. The turret locking wedge 32 is withdrawn by means of the handle 33 and the turret indexed by the handle 31 from the position shown in Figs. 1 and 7 to that shown in Figs. 2 and 8, the turret thereafter being locked by rotating the handle 33 in the opposite direction to slide the wedge into locking position. The tool holder is now moved forwardly by the hand wheel 13 to engage the tool 21 with the work whereby to finish the flange and tread. It should be understood that the tools 20 and 21 are in vertical alignment, that is, in the same axial position on the turret, and therefore only an indexing movement of the turret is necessary to bring the tool 21 into cutting position after the operation of tool 20.

*Fourth and final cutting step—Fig. 9.*

The next cutting operation is the chamfering of the edge of the tread by means of the tool 22. This tool being on the same face of the turret as tool 20, the turret is indexed back to its original position in the manner heretofore described. The handles 30 and 26 are respectively operated to release and move the slide 23 with its tool 22 from the inoperative position shown in Fig. 5 to the operative position shown in Fig. 4, the slide thereafter being clamped by means of the handle 30. In this position of the tool 22, the tool 20 is relatively to the rear thereof and in an inoperative position. The hand wheel 13 is now rotated to move the tool 22 forwardly into engagement with the wheel to chamfer off the edge thereof, as indicated in Fig. 4 and 9.

This last operation completes the turning of the wheel. It will be noted that after this final operation, the turret is left in the indexed position required for using the tool 20, it only being necessary to withdraw the tool 22 to the position shown in Fig. 5. The complete turning of a wheel therefore requires only one indexing of the turret.

What I claim is:

1. A tool holder comprising the combination of a slide, means for supporting a roughing tool rigidly thereon, a tool turret rotatably mounted on the slide and adapted to support a plurality of tools independently operative in one indexed position of the turret and another tool operative in another indexed position of the turret, and means for rotatably indexing the turret to and locking the same in either of the said positions.

2. A turret tool holder comprising the combination of a slide and a tool turret mounted on a horizontal axis thereon and adapted to support two tools in alignment in a common vertical plane extending at right angles through the said axis, one of such tools being a formed roughing tool and the other being a formed finishing tool of the same contour, and the construction and arrangement being such that the finishing tool may be brought into correct tooling position to operate on the work after the operation of the roughing tool thereon merely by indexing the turret.

3. A turret tool holder comprising the combination of a slide, a tool turret rotatably mounted thereon and adapted to support a plurality of formed tools located approximately in a single plane extending at right angles through the axis of the turret, the cutting edges of such tools extending in a general direction parallel with the turret axis and the construction being such that the tools may be successively brought into correct tooling position to operate on the work merely by rotatably indexing the turret about the said axis, and means for indexing the turret to and locking the same in its different tooling positions.

4. A turret tool holder comprising the combination of a slide, a tool turret mounted on a horizontal axis thereon and adapted to support three tools, two of such tools being in horizontal alignment and two being in a common vertical plane, means for traversing the slide to bring either of the first said two tools into cutting position without indexing the turret, and means for indexing the turret to bring either of the second said two tools into cutting position without traversing the slide.

5. A tool holder comprising the combination of a slide, means for supporting a roughing tool rigidly and directly thereon, a tool turret mounted directly on the slide laterally of the roughing tool and rotatable about a horizontal axis, the turret being adapted to support two relatively spaced tools in, vertical plane extending at right angles to the said axis, means for supporting a third tool on the turret adjacent and laterally of one of the said two tools, means for adjusting the slide laterally to bring any one of the said tools to a position opposite the work, and means for indexing and locking the turret in its respective tooling positions, the said two adjacent tools being operative on the work in the same indexed position of the turret.

6. A tool holder comprising the combination of a support, a slide mounted for movement in one direction thereon, a second slide mounted on the first slide and movable thereon in a direction at right angles to the movement of the first slide, means for supporting a roughing tool rigidly on the second slide, a tool turret mounted on the second slide laterally of the roughing tool and adapted to support a plurality of roughing and finishing tools, means for adjusting one of the slides laterally of the tools to bring either the roughing tool or the turret tools into work engaging position, means for adjusting the other slide to move the tools toward and from the work, and means for indexing and locking the turret in a plurality of tooling positions.

7. A turret tool holder comprising the combination of a support, a tool turret rotatably mounted thereon and adapted to carry a plurality of tools, means for rotatably indexing the turret to bring the tools thereon into working position, and means comprising a wedge operative between the support and one of the lateral faces of the turret head for rigidly locking the turret in its tooling positions.

8. A turret tool holder comprising the combination of a support, a tool turret mounted thereon for rotation about a horizontal axis and adapted to carry a plurality of tools, means for rotatably indexing the turret about the said axis, means comprising a sliding wedge operative between the top surfaces of the support and a bottom surface of the turret head for rigidly locking the turret in its tooling positions, and means for sliding the wedge to lock or unlock the turret.

9. A turret tool holder comprising the combination of a support, a tool turret rotatably mounted thereon and adapted to carry a plurality of tools, means for rotatably indexing the turret to bring the tools thereon into working position, means comprising a wedge of approximately the width of the turret head and, operative between the support and one side of the turret head for rigidly locking the turret in its tooling positions, and means including a handle on the support operative to slide the wedge longitudinally into and out of turret locking position.

10. A turret tool holder comprising the combination of a support, a tool turret rotatably mounted thereon and adapted to carry a plurality of tools, means for rotatably indexing the turret to bring the tools thereon into working position, means for rigidly locking the turret in its tooling positions, and a guard connected to the turret for movement therewith and extending over a portion of the support in all positions of the turret.

11. A turret tool holder comprising the combination of a support, a tool turret rotatably mounted thereon and adapted to carry a plurality of tools, means for rotatably indexing the turret to bring the tools thereon into working position, means for rigidly locking the turret in its tooling positions, and a guard pivoted to the turret for movement therewith and extending over a portion of the support in all positions of the turret.

In testimony whereof, I hereto affix my signature.

LYNDON C. COLE.